UNITED STATES PATENT OFFICE.

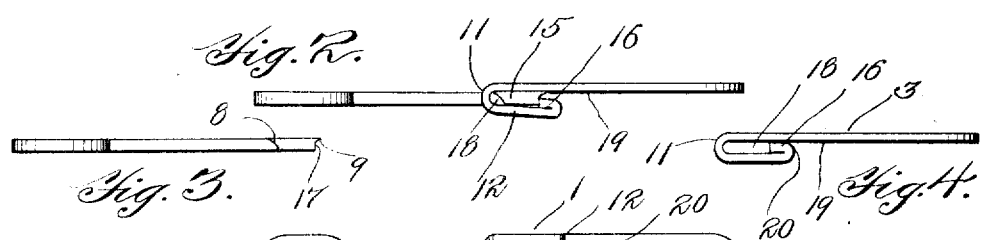
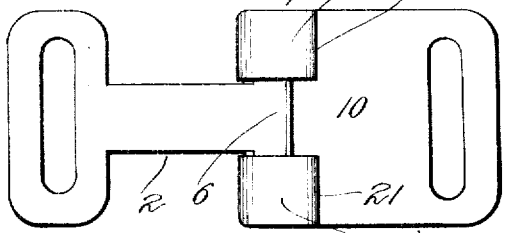
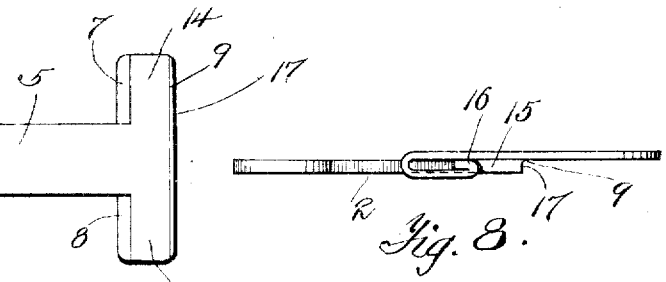
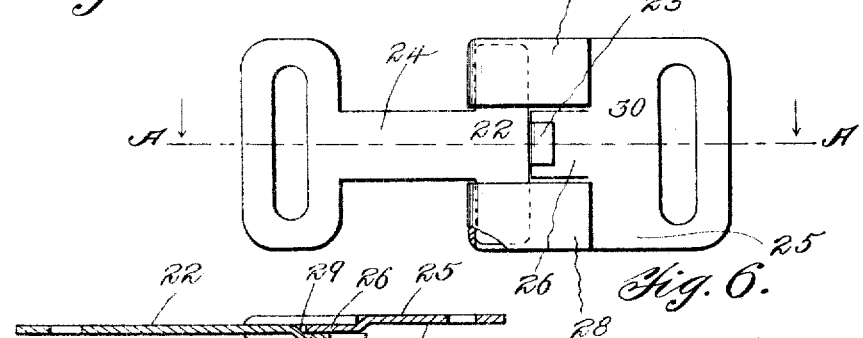

ANNA LOUISE VILANDRER, OF ST. PAUL, MINNESOTA.

CLASP.

1,271,963.  Specification of Letters Patent.  Patented July 9, 1918.

Application filed March 14, 1917. Serial No. 154,793.

*To all whom it may concern:*

Be it known that I, ANNA LOUISE VILANDRER, a citizen of the United States, residing at St. Paul, in the county of Ramsey and State of Minnesota, have invented certain new and useful Improvements in Clasps, of which the following is a specification.

This invention relates to improvements in clasps, and has for its object to provide a self locking clasp.

Another object of the invention is to provide a clasp, one member of which is formed of inflexible metal and the other member of which is provided with spring arms for securely engaging said first member.

A still further object of the invention is to provide a clasp, the members of which are self locking, and means whereby said members may be readily disconnected.

With the above and other objects in view, I have invented the device illustrated in the accompanying drawings in which, Figure 1 is a plan view of my improved clasp;

Fig. 2 is an edge view thereof;

Fig. 3 is a similar view of one member of the clasp;

Fig. 4 is a similar view of another member of the clasp;

Fig. 5 is a plan view of Fig. 3;

Fig. 6 is a top plan view of a modified form of the invention, and,

Fig. 7 is a section on the line *a—a* of Fig. 6.

Fig. 8 is a view similar to Fig. 2 but showing a different relative engagement therebetween.

Like reference characters indicate like parts throughout the following specification and in the several views in the drawings, in which 1 indicates a clasp consisting of an inflexible member 3, and a member 3 formed of resilient metal. The member 2 is provided with an attaching portion 4, having an integral shank 5, terminating in a T-head 6, the inner edges 7 and 8 of which are beveled for a purpose which will hereinafter be explained, and the outer edge 9 of which is provided with a narrow flange which will also be explained further on in the specification. The portions 4, 5 and 6 of the member 2 are stamped from flat metal and are on a common plane with one another.

The member 3 consists of a base 10, the inner edge 11 of which is provided with return resilient spaced-apart clasps 12 and 13, for engaging the ends 14 and 15 of said T-heads 6. Said clasps 12 and 13 terminate in edges 16 returned therefrom to form abutments for engaging the edge 17 of said T-head 6, whereby said ends 14 and 15 are held snugly within recesses 18, formed under said clasps 12 and 13, said ends 16 holding said T-head against relative movement with the member 3.

The widths of the recesses 18 are less than the thickness of the members 14 and 15 in order that when said T-head is seated under the clasps 12 and 13, said ends 16 which normally engage the surface 19 of the member 3 are held spaced therefrom in order that the flange 9 will normally seat between the ends 16 and the surface 19 when the members 2 and 3 are clasped together, whereby the members may be unclasped by pushing them together with sufficient force to overcome the tension of the members 12 and 13. The beveled edges 7 and 8 engage the rounded edges 20 and 21 of said members 12 and 13, and force said members away from the surface 19, whereby the T-head 6 may be readily snapped under the said clasps.

The above described arrangement permits of considerable spring tension of the clasps 12 and 13, whereby the T-head, when clasped thereunder will be held securely against movement relative to the member 3. The beveled edges 7 and 8 in combination with the rounded edges 20 and 21 of said clasp members 12 and 13 provide means whereby said clasps are forced apart from their base 19 in order to readily admit the T-heads to seat under said clasps. The space between the ends 16 of the clasps 12 and 13 and the edge 11 is just sufficient to permit the ends of the T-head to snugly fit in the spaces 18, said ends 16 engaging the edge 17 of the T-head hold the same against any accidental displacement while the flange 9 seating between the ends 16 and surface 19 provides a wedge whereby said T-head may be forced from said locking engagement.

In Figs. 6 and 7, a modification of the invention is shown, in which the T-head 22 is provided with an offset tongue 23, which when the members 24 and 25 are connected seats over the tongue 26 struck inwardly from the member 25 between the clasps 27 and 28 to lockingly engage the edge 29 of said T-head, whereby when said T-head is seated under the clasps 27 and 28, the spring tongue 26 positively locks said T-head in place and prevents its removal from under the clasps 27 and 28 until after said resilient tongue 26 is forced to a plane with the surface 30 of the member 25. This is done by means of an outward movement of the member 24, whereby the tongue 23 forces down the tongue 26, thus permitting said T-head 22 to pass from under the clasp members 27 and 28.

I claim:

1. A clasp and a T-head, said clasp having integral resilient means for locking engagement therewith.

2. The described device consisting of an inflexible clasp member having a T-head and a clasping member having spring arms for engaging the opposing ends of said head, said arms having returned ends normally engaging the surface of the clasping member and means whereby the said ends may be moved to permit the T-head to pass thereunder.

3. The described device consisting of an inflexible clasp member having a T-head and a clasping member having spring arms for engaging the opposing ends of said head, said arms having returned ends normally engaging the surface of the clasping member and means whereby the said ends will raise said arms to permit the T-head to pass thereunder, said returned ends forming abutments to hold said T-head against movement relative to the clasping member.

4. A clasp and a T-head, said clasp having integral means for locking engagement therewith, said means consisting of spring arms.

5. A clasp and a T-head, said clasp having integral means for locking engagement therewith, said T-head having means for controlling said means.

6. A clasp embracing an inflexible member and a resilient member, the former having a shank and a T-head formed on a common plane therewith, said second member having spring arms for engagement with said T-head, the ends of said arms being bent inwardly thereon to form stops for engaging the edge of said T-head to hold the same against movement relative to the second member.

7. A clasp embracing an inflexible member and a resilient member, the former having a shank and a T-head formed on a common plane therewith, said second member having spring hooks for engagement with said T-head, the ends of said hooks being bent inwardly thereon to form stops for engaging the edge of said T-head to hold the same against movement relative to the second member, said hook ends engaging the surface of the second member and means on said first member whereby said ends may be lifted to admit said T-head thereunder.

8. A clasp embracing an inflexible member and a resilient member, the former having a shank and a T-head formed on a common plane therewith, said second member having spring hooks for engagement with said T-head, the ends of said hooks being bent inwardly thereon to form stops for engaging the edge of said T-head to hold the same against movement relative to the second member, said hook ends engaging the surface of the second member and means on said first member whereby said ends may be lifted to admit said T-head thereunder, said T-head being of a thickness greater than the normal space between the main portion of said hooks and said surface whereby said ends are held spaced apart from said surface by said T-head to permit the removal of said T-head from behind said returned ends.

9. A clasp and a T-head, said clasp having integral means for locking engagement therewith, said T-head having means for controlling said means, said last means consisting of a knife edge.

10. The described device consisting of a clasp member having a shank terminating in a T-head on a common plane therewith, and a clasping member having spring arms spaced apart to receive said shank, said arms having returned ends for engaging the outer edge of said T-head whereby the clasp member and clasping member are held in locked relation.

11. The described device consisting of a clasp member having a shank terminating in a T-head on a common plane therewith, and a clasping member having spring arms spaced apart to receive said shank, said arms having returned ends for engaging the outer edge of said T-head whereby the clasp member and clasping member are held in locked relation, said returned ends normally engaging the body of said clasping member, said T-head adapted to hold said ends out of engagement with said body, and means on said T-head adapted to seat between said ends and body whereby said members may be forced apart.

12. The described device consisting of a clasp member having a shank terminating in a T-head on a common plane therewith, and a clasping member having spring arms spaced apart to receive said shank, said arms having returned ends for engaging the outer edge of said T-head whereby the clasp member and clasping member are held in locked relation, said returned ends normally engaging the body of said clasping member, said T-head adapted to hold said ends out of engagement with said body, and means on said T-head adapted to seat between said ends and body whereby said members may be forced apart, said means consisting of a flange formed on the outer edge of said T-head.

13. The described device consisting of a pair of engaging members, one having a T-head, and the other having a pair of resilient arms for engaging said head, and means whereby said members are held in locking relation.

14. The described device consisting of a pair of engaging members, one having a T-head, and the other having a pair of spring arms for engaging said head, means whereby said members are held in locking relation, and means on the former whereby said members may be disengaged.

15. The described device consisting of a pair of engaging members, one having a T-head, and the other having a pair of arms for engaging said head, means whereby said members are held in locking relation, means whereby said members may be disengaged, said locking means being formed on one of said members, and said disengaging means being formed on the other of said members.

16. The described device consisting of a pair of engaging members, one having a T-head, and the other having a pair of arms for engaging said head, means whereby said members are held in locking relation, means whereby said members may be disengaged, said locking means being formed on one of said members, and said disengaging means being formed on the other of said members, said locking means being adapted to abut the edge of said T-head.

17. The described device consisting of a pair of engaging members, one having a T-head, and the other having a pair of arms for engaging said head, means whereby said members are held in locking relation, means whereby said members may be disengaged, said locking means being formed on one of said members, and said disengaging means being formed on the other of said members, said locking means being adapted to abut the edge of said T-head and having resilient engagement therewith.

18. The described device consisting of a pair of engaging members, one having a T-head and the other having a pair of arms for engaging said head, means whereby said members are held in locking relation, means whereby said members may be disengaged, said locking means being formed on one of said members, and said disengaging means being formed on the other of said members, said locking means being adapted to abut the edge of said T-head and having resilient engagement therewith, said disengaging means consisting of a flange formed on said edge.

19. A clasp and a T-head, said clasp having integral means for locking engagement therewith, said T-head having means for controlling said means, said last means consisting of a knife edge on both longitudinal edges of the T-head.

20. A clasp having hooked members with returned ends, and another member adapted to be held locked to this first member by said ends.

21. A clasp having spaced apart hooks, another member engageable by said hooks, and integral means on the first member for holding said members in locked relation.

In testimony whereof I affix my signature in the presence of two witnesses.

ANNA LOUISE VILANDRER.

Witnesses:
GEORGE WEDDERBURN,
G. C. TRACY.